(12) United States Patent
Tsuchihashi et al.

(10) Patent No.: US 11,181,948 B1
(45) Date of Patent: Nov. 23, 2021

(54) STAND DEVICE

(71) Applicant: LENOVO (SINGAPORE) PTE. LTD., Singapore (SG)

(72) Inventors: Moriyuki Tsuchihashi, Yokohama (JP); Kazuo Fujii, Yokohama (JP)

(73) Assignee: LENOVO (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 16/904,663

(22) Filed: Jun. 18, 2020

(30) Foreign Application Priority Data

May 8, 2020 (JP) .............................. JP2020-082478

(51) Int. Cl.
  *G06F 1/16* (2006.01)
  *F16M 11/04* (2006.01)
  *A45C 11/00* (2006.01)

(52) U.S. Cl.
  CPC ........... *G06F 1/166* (2013.01); *F16M 11/041* (2013.01); *G06F 1/1628* (2013.01); *G06F 1/1632* (2013.01); *G06F 1/1662* (2013.01); *A45C 2011/003* (2013.01)

(58) Field of Classification Search
  CPC .................................................. G06F 1/1632
  See application file for complete search history.

(56) References Cited

U.S. PATENT DOCUMENTS

| | | | | |
|---|---|---|---|---|
| 10,114,410 | B2 * | 10/2018 | Ke | G06F 1/1681 |
| 10,211,874 | B2 * | 2/2019 | Kao | A45C 11/00 |
| 2013/0328917 | A1 * | 12/2013 | Zambetti | G06F 1/1626 |
| | | | | 345/620 |

FOREIGN PATENT DOCUMENTS

JP 2018028601 A 2/2018

* cited by examiner

*Primary Examiner* — Mukundbhai G Patel
(74) *Attorney, Agent, or Firm* — Shimokaji IP

(57) ABSTRACT

A stand device includes a first cover and a second cover. The first cover and the second cover are pivotably connected to each other at their opposing side portions thereof. The first cover includes a first plate portion which support a rear surface of an electronic apparatus, a second plate portion coupled to the first plate portion, a third plate portion coupled to the second plate portion and a fourth plate portion 14 coupled to the third plate portion and the first plate portion, and the first to fourth plate portions are connected with each other to form an endless annular shape. The stand device is switchable between a stand mode and a cover mode.

11 Claims, 14 Drawing Sheets

STAND DEVICE

FIELD OF THE INVENTION

The present invention relates to a stand device.

BACKGROUND OF THE INVENTION

Stand devices, such as one disclosed in Japanese Unexamined Patent Application Publication No. 2018-28601, that can hold an electronic apparatus such as a tablet personal computer (PC) in an upright posture have been conventionally known.

SUMMARY OF THE INVENTION

There is generally a demand for improvement in usability of stand devices of this kind.

One of objects of the present invention is to provide a stand device capable of improving usability thereof.

An aspect of a stand device of the present invention includes: a first cover which can hold an electronic apparatus in an upright posture; and a second cover on which an input unit that can output an input signal to the electronic apparatus is disposed, wherein the first cover and the second cover are pivotably connected to each other at opposing side portions thereof, the first cover is composed of a first plate portion supporting a rear surface of the electronic apparatus, a second plate portion coupled to the first plate portion, a third plate portion coupled to the second plate portion and a fourth plate portion coupled to the third plate portion and the first plate portion, the first to fourth plate portions being connected with each other to form an endless annular shape, and the stand device is switchable between a stand mode in which the third plate portion, the fourth plate portion and at least a part of the first plate portion are arranged to form a triangle in side view; and a cover mode in which the first plate portion, the second plate portion, the third plate portion and the fourth plate portion are folded into a two-layer plate.

The stand device according to an aspect of the present invention can improve usability thereof.

DETAILED DESCRIPTION OF THE INVENTION

First Embodiment

Figure 1:
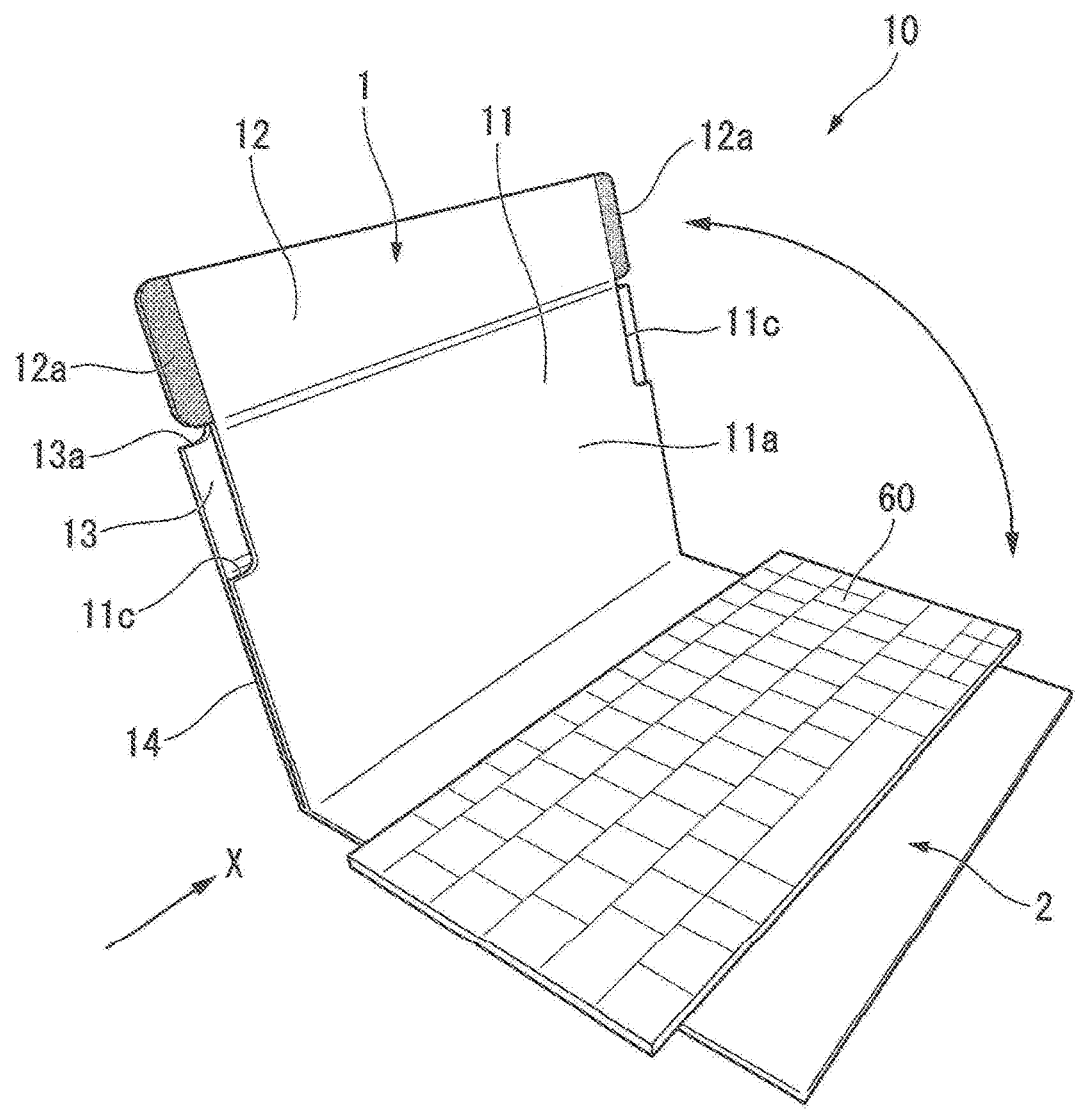
FIG. 1 is a perspective view illustrating a stand device according to a first embodiment in a cover mode.

A stand device 10 according to a first embodiment of the present invention will now be described with reference to FIGS. 1 to 8.

As illustrated in FIGS. 1 to 6, the stand device 10 of this embodiment includes a first cover 1 which can hold an electronic apparatus 50 such as a tablet PC in an upright posture and a second cover 2 on which an input unit 60 that can output an input signal to the electronic apparatus 50 is disposed. The first cover 1 and the second cover 2 are pivotably connected to each other at their opposing side portions.

The first cover 1 includes a plurality of plate portions 11, 12, 13 and 14 described below that are coupled to each other via coupling members such as flexible sheets (e.g., fabric hinges) located alternately with the respective plate portions 11, 12, 13 and 14 to form an endless annular shape. Other structure of the first cover will be described later. The second cover 2 is a quadrilateral plate, specifically a rectangular plate.

Figure 2:
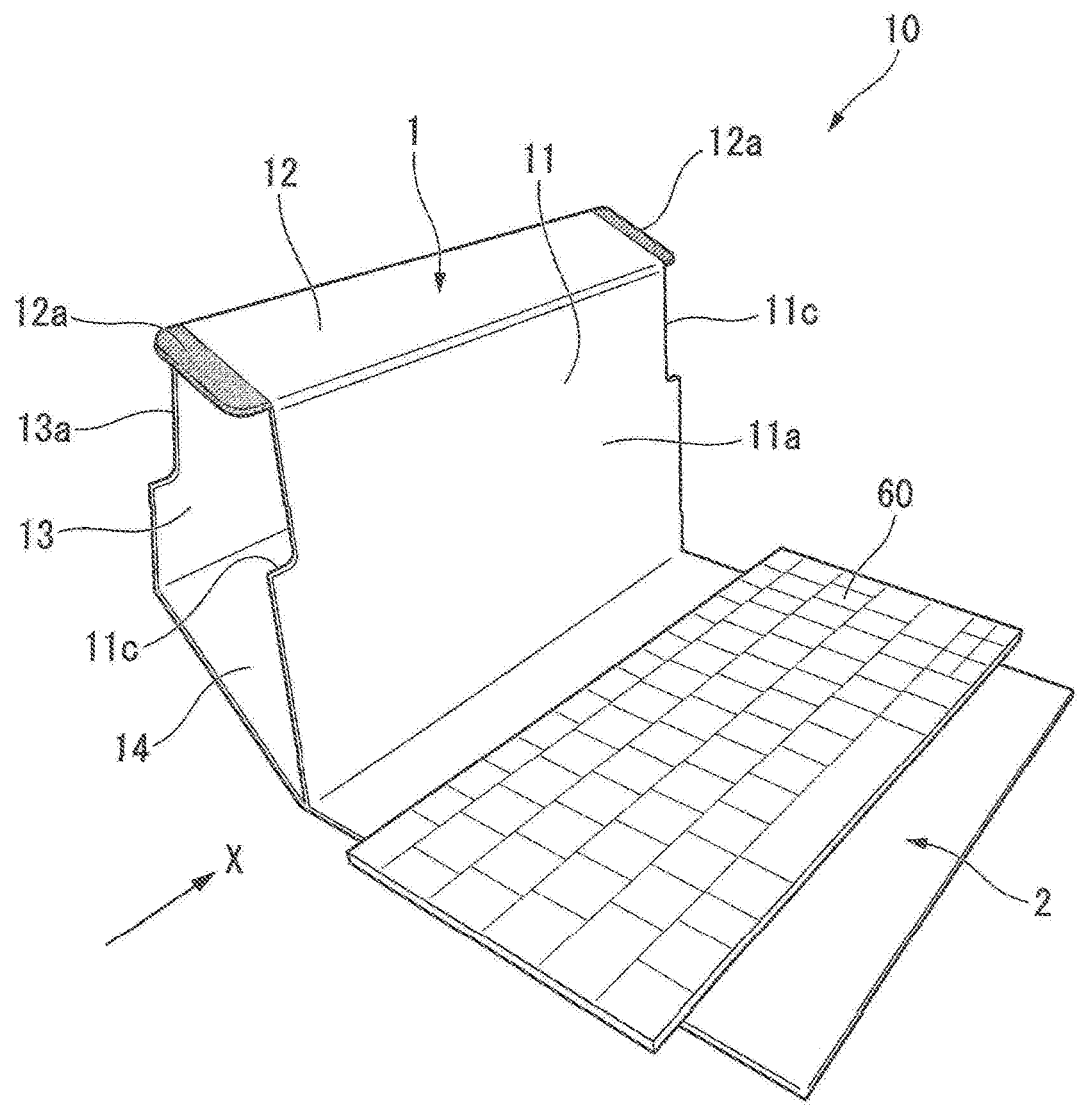
FIG. 2 is a perspective view illustrating the stand device according to the first embodiment in a transition between the cover mode and a stand mode.
Figure 3:
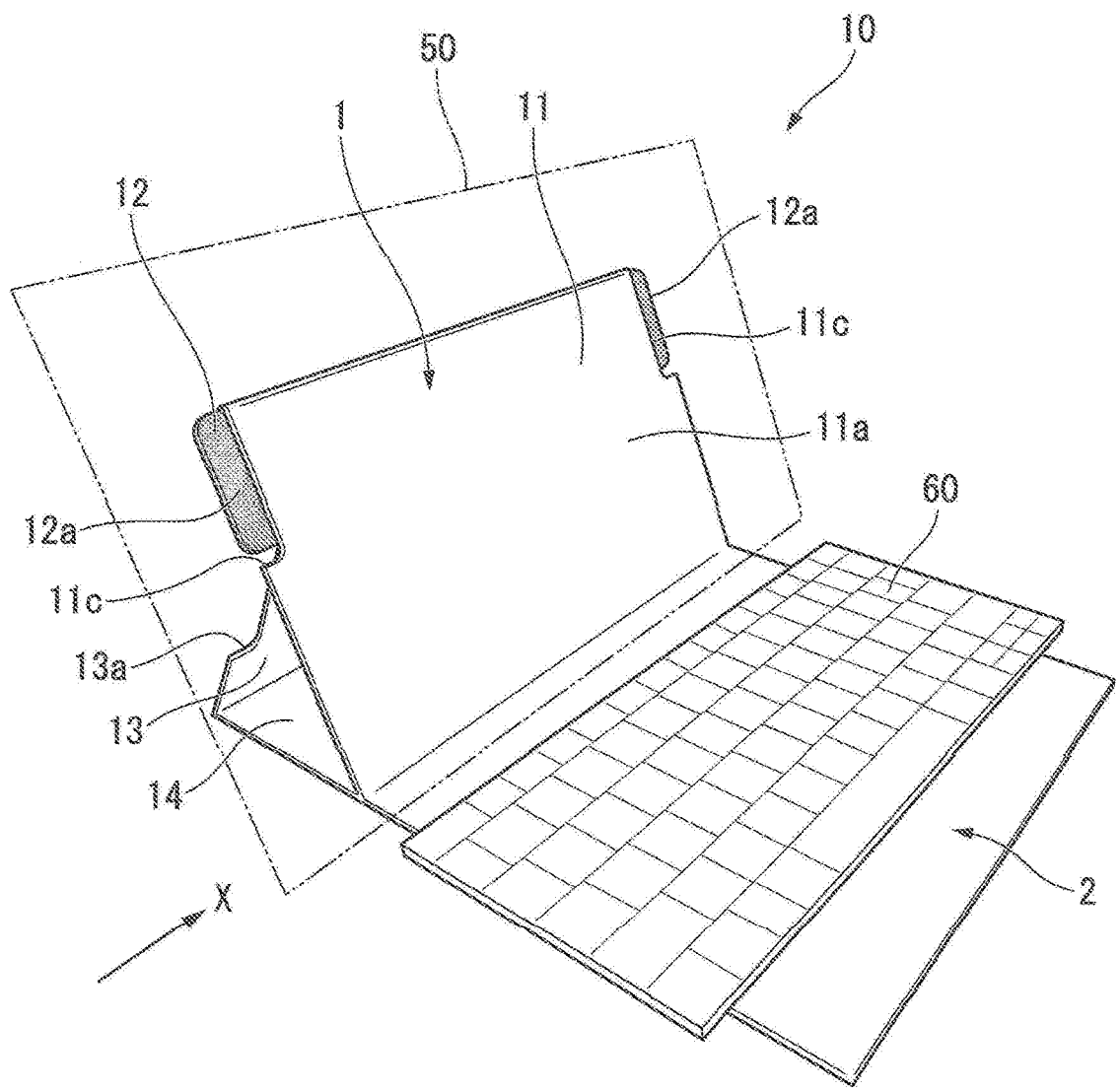
FIG. 3 is a perspective view illustrating the stand device according to the first embodiment in the stand mode.
Figure 4:
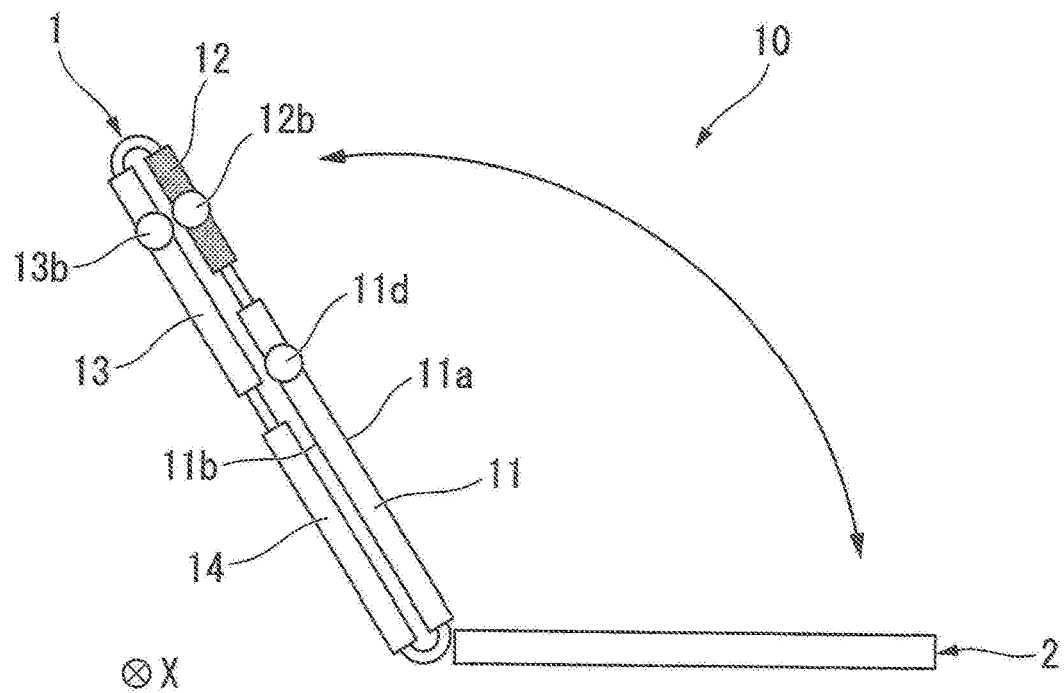
FIG. 4 is a side view schematically illustrating the stand device according to the first embodiment in the cover mode.
Figure 5:
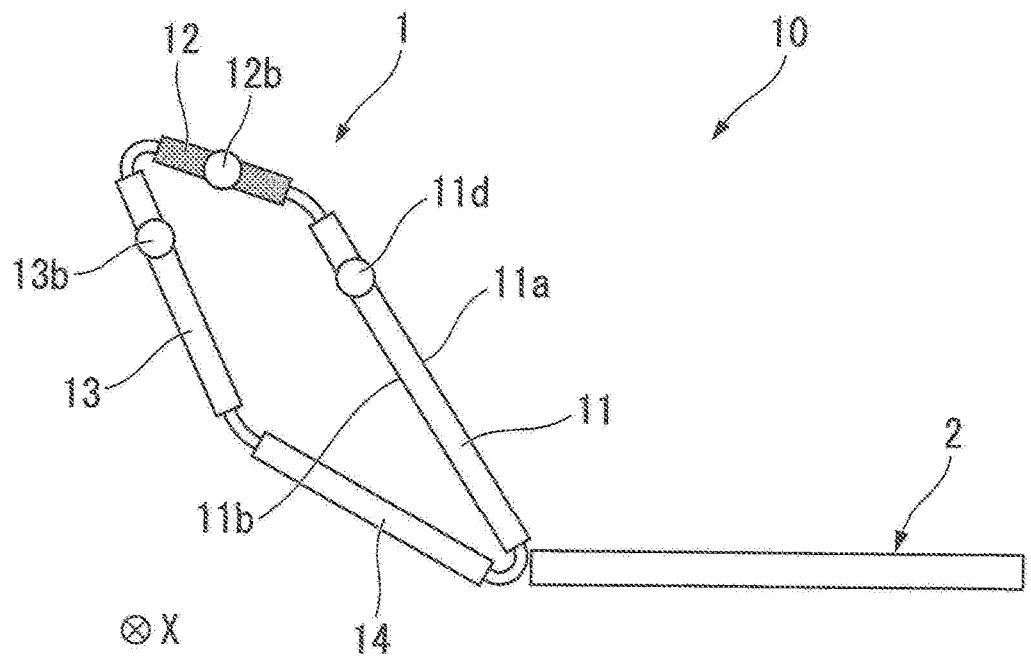
FIG. 5 is a side view schematically illustrating the stand device according to the first embodiment in the transition between the cover mode and the stand mode.

The stand device 10 is switchable between a stand mode in which the stand device holds the electronic apparatus 50 in an upright posture (FIGS. 3 and 6) and a cover mode in which the first cover 1 and the second cover 2 can be folded together (FIGS. 1 and 4). Note that FIGS. 2 and 5 illustrate a transition between the cover mode and the stand mode.

In the cover mode, the first cover 1 is quadrilateral in plan view. The second cover 2 is quadrilateral in plan view. The first cover 1 and the second cover 2 are shaped and sized to be substantially identical in plan view.

The electronic apparatus 50 is a tablet PC of foldable type that can be folded in half, for example. The electronic apparatus 50 is quadrilateral in plan view either when a display thereof is unfolded or when the display is folded in half. A shape and a size in plan view of the electronic apparatus 50 when folded in half are substantially the same as those of the stand device 10 when folded in half (cover mode). As such, the electronic apparatus 50 folded in half can be sandwiched by or stacked with the stand device 10 folded in half so that a user can carry or store the stand device 10 and the electronic apparatus 50 compactly together.

The input unit 60 is a keyboard, for example. The input unit 60 outputs an input signal inputted by the user to the electronic apparatus 50 wirelessly using Bluetooth (registered trademark) or the like. The input unit 60 is mounted on one of a pair of surfaces of the second cover 2 that can face the first cover 1 in the cover mode. The input unit 60 may be detachably fixed to the second cover 2.

The first cover 1 includes a first plate portion 11 which support a surface of the electronic apparatus 50 that faces away from the display, i.e., a rear surface thereof, a second plate portion 12 coupled to the first plate portion 11, a third plate portion 13 coupled to the second plate portion 12 and a fourth plate portion 14 coupled to the third plate portion 13 and the first plate portion 11. The first cover 1 is composed of the first plate portion 11, the second plate portion 12, the third plate portion 13 and the fourth plate portion 14 that are connected with each other to form an endless annular shape.

Each of the first plate portion 11, the second plate portion 12, the third plate portion 13 and the fourth plate portion 14 is a quadrilateral plate, specifically a rectangular plate.

The first plate portion 11 and the second plate portion 12 are pivotably coupled to each other at their opposing sides. The second plate portion 12 and the third plate portion 13 are pivotably coupled to each other at their opposing sides. The third plate portion 13 and the fourth plate portion 14 are pivotably coupled to each other at their opposing sides. The fourth plate portion 14 and the first plate portion 11 are pivotably coupled to each other at their opposing sides.

In this disclosure, a direction in which these sides extend (X-axis direction in the drawings) is called a lateral direction. The lateral direction corresponds to a left-right direction seen from the user using the electronic apparatus 50, the input unit 60 and the stand device 10. A direction that is orthogonal to a thickness direction and the lateral direction of the plate portions 11, 12, 13 and 14 is called a longitudinal direction.

A side of the first plate portion 11 and a side portion of the second cover 2 opposed thereto are pivotably coupled to each other. A side of the fourth plate portion 14 and the side portion of the second cover 2 opposed thereto are pivotably coupled to each other.

Figure 6:
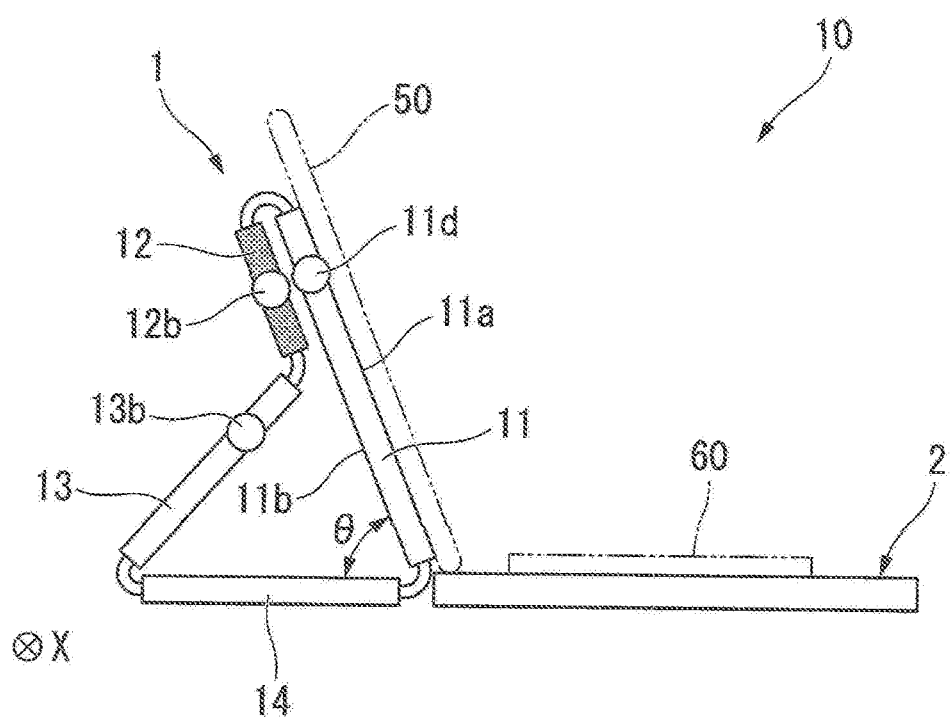
FIG. 6 is a side view schematically illustrating the stand device according to the first embodiment in the stand mode.

As illustrated in FIGS. 3 and 6, in the stand mode, the third plate portion 13, the fourth plate portion 14 and at least a part of the first plate portion 11 are arranged to form a triangle in side view (i.e., when seen from the X-axis direction). Specifically, a part of the first plate portion 11 other than an end thereof that is coupled to the second plate portion 12, the third plate portion 13 and the fourth plate portion 14 are arranged to constitute respective sides of a triangle in side view. An angle θ formed between the first plate portion 11 and the fourth plate portion 14 in side view is 30° to 70°, for example.

As illustrated in FIGS. 1 and 4, in the cover mode, the first plate portion 11, the second plate portion 12, the third plate portion 13 and the fourth plate portion 14 are folded into a two-layer plate. Specifically, a plate layer including the first plate portion 11 and second plate portion 12 and another plate layer including the third plate portion 13 and the fourth plate portion 14 are overlapped one another (laminated). The plate layer including the first plate portion 11 and the second plate portion 12 can face the second cover 2.

In an example of this embodiment, the first plate portion 11, the second plate portion 12, the third plate portion 13 and the fourth plate portion 14 have the same lateral length. The first cover 1 and the second cover 2 also have the same lateral length. In the cover mode, they have the same longitudinal length as well.

The first plate portion 11 has the greatest longitudinal length of all of first plate portion 11, the second plate portion 12, the third plate portion 13 and the fourth plate portion 14. As illustrated in FIG. 6, in the stand mode, the first plate portion 11 touches the rear surface of the electronic apparatus 50.

Figure 7A:
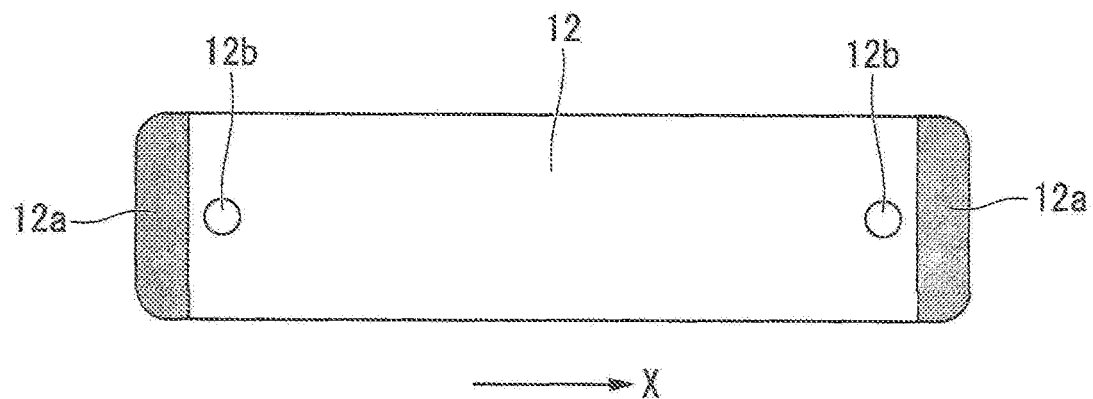
FIG. 7A is a plan view illustrating a second plate portion of the first embodiment.
Figure 7B:
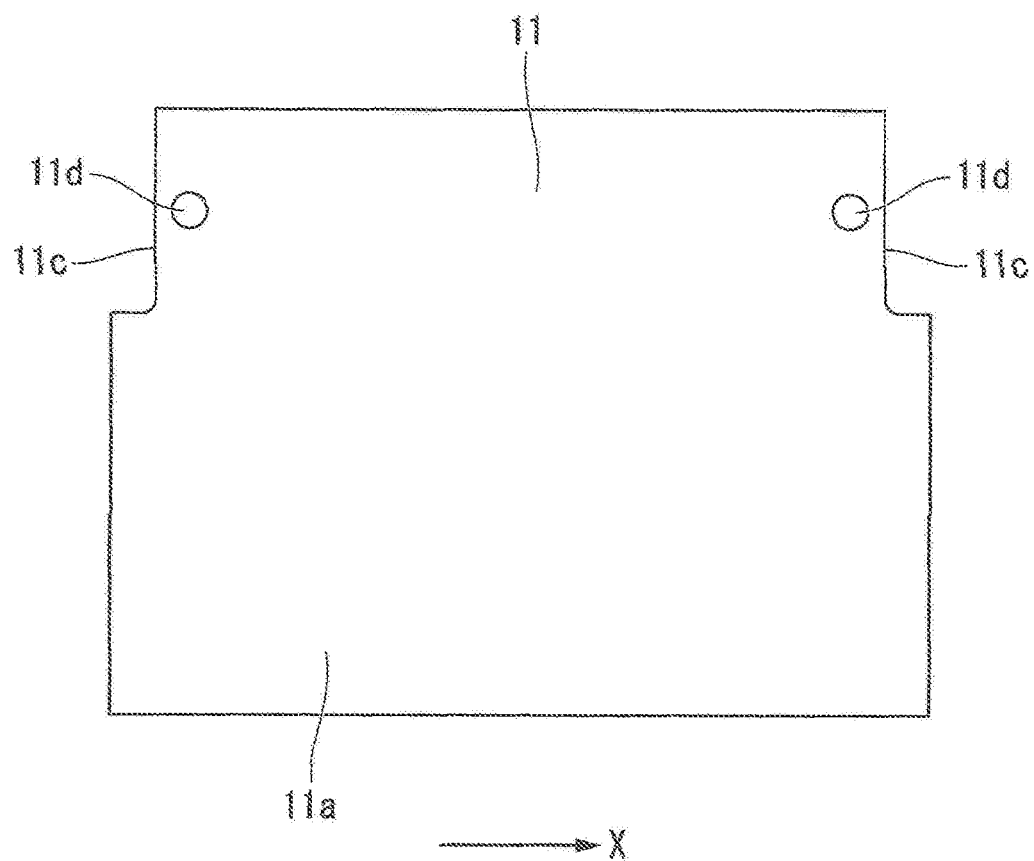
FIG. 7B is a plan view illustrating a first plate portion of the first embodiment.

As illustrated in FIGS. 6 and 7B, the first plate portion 11 includes a front surface 11a, a back surface 11b, a cutout portion 11c and a first magnet 11d.

The front surface 11a is one of a pair of surfaces of the first plate portion 11 that faces the electronic apparatus 50 and touches the rear surface thereof. The back surface 11b is an other one of the pair of surfaces of the first plate portion 11 that faces away from the electronic apparatus 50.

As for the lateral direction, the first cutout portion 11c is arranged at an end of the first plate portion 11 so as to be recessed from a lateral end surface thereof. As for the longitudinal direction, the first cutout portion 11c is arranged at the end of the first plate portion 11 that is coupled to the second plate portion 12. The first cutout portion 11c extends in the longitudinal direction that is orthogonal to the thickness and lateral directions of the first plate portion 11. In this embodiment, a pair of first cutout portions 11c, one at each lateral end of the first plate portion 11, is provided.

The first magnet 11d is disposed within the first plate portion 11. However, the first magnet 11d may also be exposed to an outside of the first plate portion 11. In this embodiment, the first magnet 11d is arranged at a lateral end of the first plate portion 11. The first magnet 11d is located laterally inside the first cutout portion 11c. In this embodiment, a pair of first magnets 11d, one at each lateral end of the first plate portion 11, is provided.

The second plate portion 12 has the smallest longitudinal length of all of the first plate portion 11, the second plate portion 12, the third plate portion 13 and the fourth plate portion 14. As illustrated in FIG. 6, in the stand mode, a surface of the second plate portion 12 faces the back surface 11b of the first plate portion 11. As illustrated in FIG. 4, in the cover mode, the surface of the second plate portion 12 faces a surface of the third plate portion 13.

As illustrated in FIG. 7A, the second plate portion 12 includes a grip portion (tab portion) 12a and a second magnet 12b.

The grip portion 12a is arranged at a lateral end of the second plate portion 12 and extends in the longitudinal direction that is orthogonal to the thickness and lateral directions of the second plate portion 12. In the illustrated example, the grip portion 12a extends along an entire longitudinal length of the second plate portion 12. In this embodiment, a pair of grip portions 12a, one at each lateral end of the second plate portion 12, is provided.

As illustrated in FIG. 3, in the stand mode, the first cutout portion 11c is arranged to overlap with the grip portion 12a. The grip portion 12a is then exposed through the first cutout portion 11c to the electronic apparatus 50 side of the first plate portion 11 in the thickness direction. In the illustrated example, a lateral size of the first cutout portion 11c is substantially the same as that of the grip portion 12a. A longitudinal size of the first cutout portion 11c is equal to or greater than that of the grip portion 12a.

Note that, in this embodiment, the grip portion 12a is colored differently from other parts of the second plate portion 12 and the plate portions 11, 13 and 14.

The second magnet 12b is disposed within the second plate portion 12. However, the second magnet 12b may also be exposed to an outside of the second plate portion 12. As illustrated in FIG. 7A, in this embodiment, the second magnet 12b is arranged at a lateral end of the second plate portion 12. The second magnet 12b is located laterally inside the grip portion 12a. In this embodiment, a pair of second magnets 12b, one at each lateral end of the second plate portion 12, is provided.

In the stand mode, the first magnet 11d and the second magnet 12b overlap with each other in the thickness direction of the first plate portion 11 (see FIG. 6). As the first magnet 11d and the second magnet 12b are attracted to each other by magnetic force, the back surface lib of the first plate portion 11 and the surface of the second plate portion 12 are held to face each other, i.e., in a stand-mode posture. In other words, the magnetic force attracts the first plate portion 11 and the second plate portion 12 to each other.

As illustrated in FIG. 4, in the cover mode, the surface of the third plate portion 13 faces the surface of the second plate portion 12 and the back surface 11b of the first plate portion 11. As illustrated in FIG. 6, in the stand mode, a side of the third plate portion 13 that is connected to the second plate portion 12 faces the back surface 11b of the first plate portion 11. The third plate portion 13 then can support the back surface 11b of the first plate portion 11 directly or indirectly via the second plate portion 12.

Figure 8A:
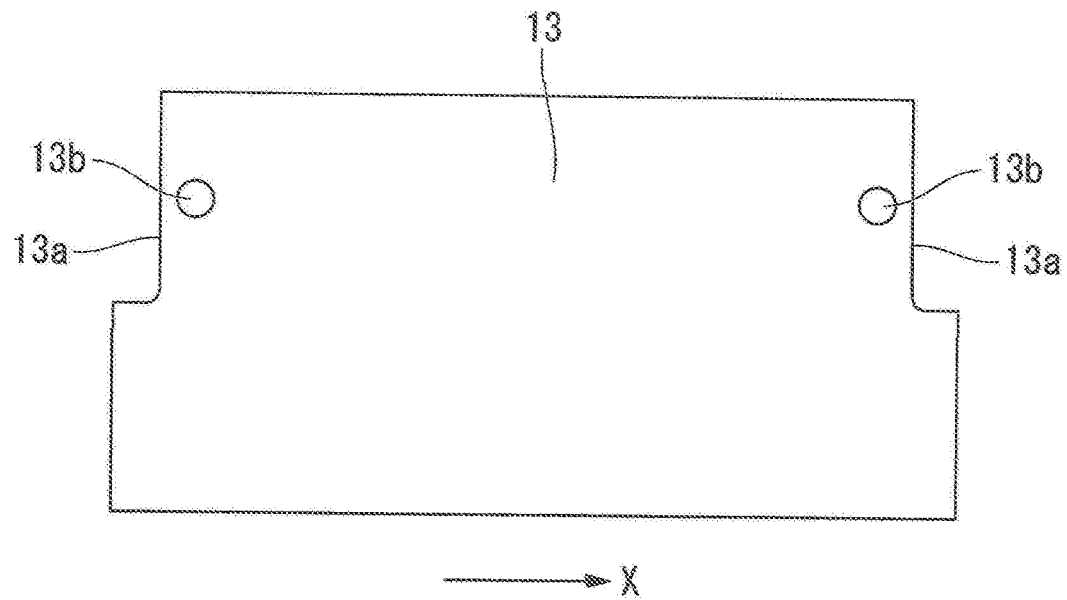
FIG. 8A is a plan view illustrating a third plate portion of the first embodiment.

As illustrated in FIG. 8A, the third plate portion 13 includes a second cutout portion 13a and a third magnet 13b.

As for the lateral direction, the second cutout portion 13a is arranged at an end of the third plate portion 13 so as to be recessed from a lateral end surface thereof. As for the longitudinal direction, the second cutout portion 13a is arranged at an end of the third plate portion 13 that is coupled to the second plate portion 12. The second cutout portion 13a extends in the longitudinal direction that is orthogonal to the thickness and lateral directions of the third plate portion 13. In this embodiment, a pair of second cutout portions 13a, one at each lateral end of the third plate portion 13, is provided.

As illustrated in FIG. 1, in the cover mode, the second cutout portion 13a is arranged to overlap with the grip portion 12a. The grip portion 12a is then exposed through the second cutout portion 13a to a side of the third plate portion 13 that is opposite to the electronic apparatus 50 (a back-surface side) in the thickness direction. In the illustrated example, a lateral size of the second cutout portion 13a is substantially the same as that of the grip portion 12a. A longitudinal size of the second cutout portion 13a is equal to or greater than that of the grip portion 12a.

As illustrated in FIGS. 1 to 3, in this embodiment, the first cutout portion 11c provided in the first plate portion 11 and the second cutout portion 13a provided in the third plate portion 13 allows the grip portion 12a to be exposed to the both sides, i.e., the front and back side of the second plate portion 12 in the thickness direction thereof in the stand mode and the cover mode, respectively.

The third magnet 13b is disposed within the third plate portion 13. However, the third magnet 13b may also be exposed to an outside of the third plate portion 13. As illustrated in FIG. 8A, in this embodiment, the third magnet 13b is arranged at a lateral end of the third plate portion 13. The third magnet 13b is located laterally inside the second cutout portion 13a. In this embodiment, a pair of third magnets 13b, one at each lateral end of the third plate portion 13, is provided.

In the cover mode, the third magnet 13b and the second magnet 12b overlap with each other in the thickness direction of the third plate portion 13 (see FIG. 4). As the third magnet 13b and the second magnet 12b are attracted to each other by magnetic force, the surface of the third plate portion 13 and the surface of the second plate portion 12 are held to face each other, i.e., in a cover-mode posture. In other words, the magnetic force attracts the third plate portion 13 and the second plate portion 12 to each other.

As illustrated in FIG. 4, in the cover mode, a surface of the fourth plate portion 14 faces the back surface 11b of the first plate portion 11. As illustrated in FIG. 6, in the stand mode, an other surface of the fourth plate portion 14 faces a top surface of a table or the like on which the stand device 10 is placed.

Figure 8B:
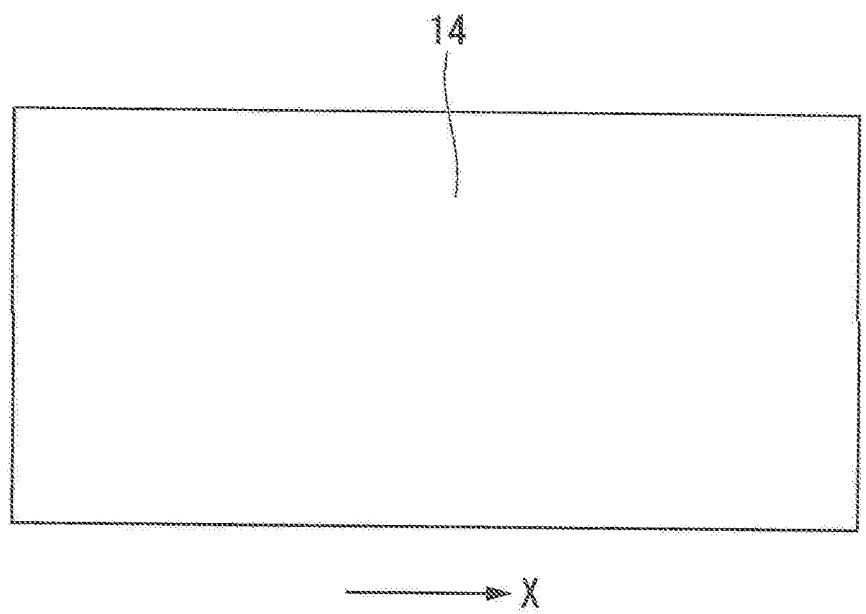
FIG. 8B is a plan view illustrating a fourth plate portion of the first embodiment.

As illustrated in FIG. 8B, the fourth plate portion 14 does not include a magnet in this embodiment. However, the fourth plate portion 14 is not limited to such one but may include an unillustrated fourth magnet. In that case, in the cover mode illustrated in FIG. 4, if the fourth magnet and an unshown magnet in the first plate portion 11 overlap with each other in the thickness direction of the fourth plate portion 14, the fourth magnet and the unshown magnet are attracted to each other by magnetic force. Thereby, the surface of the fourth plate portion 14 and the back surface 11b of the first plate portion 11 are held to face each other, i.e., in a cover-mode posture. In other words, the magnetic force attracts the fourth plate portion 14 and the first plate portion 11 to each other.

Thus, the stand device 10 of this embodiment described above can be easily switched between the stand mode and the cover mode by inverting the second plate portion 12 of the first cover 1 that is composed of the first plate portion 11, the second plate portion 12, the third plate portion 13 and the fourth plate portion 14 coupled to each other to form an endless annular shape. This simple structure enables the improvement of the usability of the stand device 10.

According to this embodiment, the grip portion 12a is provided at the lateral end of the second plate portion 12.

The user can then pick the grip portion 12a with his or her fingers to invert the second plate portion 12, which allows an easy switching between the stand mode and the cover mode.

According to this embodiment, the first plate portion 11 includes the first cutout portion 11c.

The grip portion 12a is then exposed through the first cutout portion 11c in the stand mode, which makes it possible for the user to pick the grip portion 12a with his or her fingers and switch the stand device from the stand mode to the cover mode easily.

The first cutout portion 11c also serves to maintain functionality of the grip portion 12a and, at the same time, prevent the grip portion 12a from laterally protruding from the first plate portion 11. This results in a compact contour and a good appearance design of the stand device 10.

According to this embodiment, the third plate portion 13 includes the second cutout portion 13a.

The grip portion 12a is then exposed through the second cutout portion 13a in the cover mode, which makes it possible for the user to pick the grip portion 12a with his or her fingers and switch the stand device from the cover mode to the stand mode easily.

The second cutout portion 13a also serves to maintain functionality of the grip portion 12a and, at the same time, prevent the grip portion 12a from laterally protruding from the third plate portion 13. This results in a compact contour and a good appearance design of the stand device 10.

According to this embodiment, the grip portion 12a is exposed to the both sides of the second plate portion 12 in the thickness direction thereof in the stand mode and the cover mode, respectively.

The user can then pick the grip portion 12a with his or her fingers to switch the stand device from the cover mode to the stand mode and vice versa easily.

According to this embodiment, the grip portion 12a has a lengthwise shape extending in the longitudinal direction. The user can then invert the second plate portion 12 more easily by applying his or her fingers on respectively different longitudinal locations on the front and back sides of the grip portion 12a.

According to this embodiment, the magnetic force attracts the first plate portion 11 and the second plate portion 12 to each other in the stand mode.

This allows the stand device to be stably maintained in a stand-mode state.

According to this embodiment, the magnetic force attracts the second plate portion 12 and the third plate portion 13 to each other in the cover mode.

This allows the stand device to be stably maintained in a cover-mode state.

Second Embodiment

A stand device 20 according to a second embodiment of the present invention will now be described with reference to FIGS. 9 to 12. Note that like components as in the previous embodiment are denoted by like reference symbols, and their descriptions may be omitted.

Figure 9:
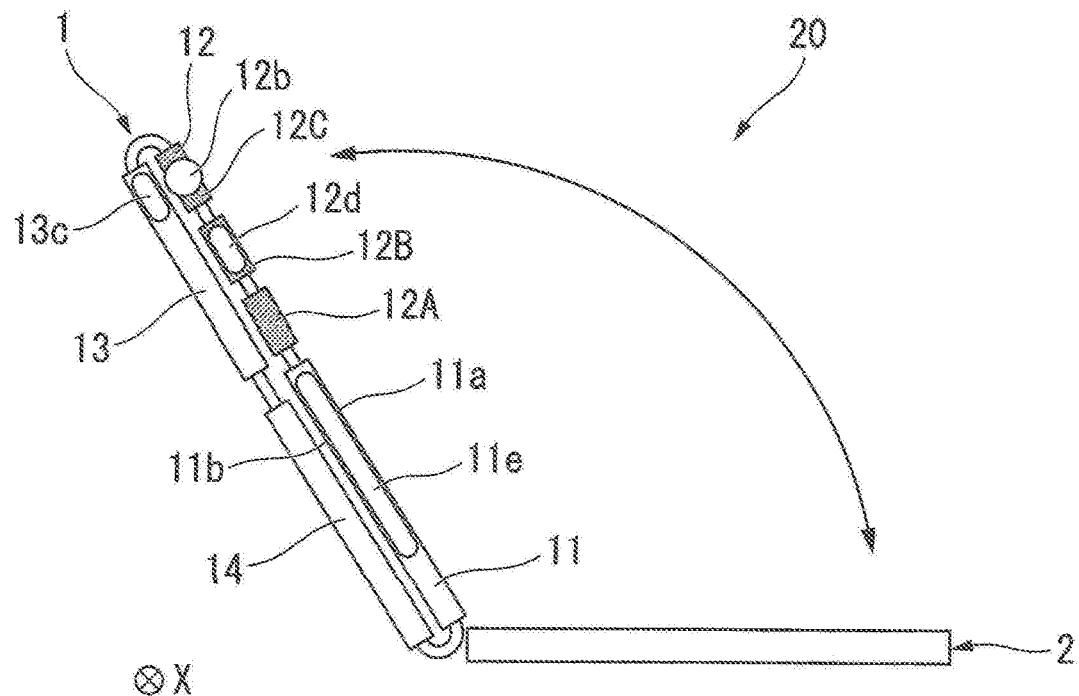
FIG. 9 is a side view schematically illustrating a stand device according to a second embodiment in the cover mode.

As illustrated in FIG. 9, in this embodiment, a first plate portion 11 includes a first magnetic body 11e. The first magnetic body 11e is a metal plate or the like which can be attracted to a magnet. The first magnetic body 11e is disposed within the first plate portion 11. However, the first magnetic body 11e may also be exposed to an outside of the first plate portion 11. In the illustrated example, the first magnetic body 11e is arranged in a part of the first plate portion 11 other than a longitudinal end that is coupled to a fourth plate portion 14.

A second plate portion 12 includes a plurality of divided plate portions 12A, 12B and 12C that are mutually divided in the longitudinal direction that is orthogonal to the thickness and lateral directions of the second plate portion 12. The plurality of divided plate portions 12A, 12B and 12C are coupled to each other via coupling members such as flexible sheets located alternately with the respective divided plate portions 12A, 12B and 12C. Each of the divided plate portions 12A, 12B and 12C is a quadrilateral plate, specifically a rectangular plate. Each of the divided plate portions 12A, 12B and 12C has a greater size in the lateral direction than in the longitudinal direction.

Among the plurality of divided plate portions 12A, 12B and 12C, a first divided plate portion 12A is coupled to the first plate portion 11, a second divided plate portion 12C is coupled to a third plate portion 13, and a third divided plate portion 12B is coupled to the first divided plate portion 12A and the second divided plate portion 12C.

The first divided plate portion 12A and the first plate portion 11 are pivotably coupled to each other at their opposing sides. The second divided plate portion 12C and the third plate portion 13 are pivotably coupled to each other at their opposing sides. The first divided plate portion 12A and the third divided plate portion 12B are pivotably coupled to each other at their opposing sides. The second divided plate portion 12C and the third divided plate portion 12B are pivotably coupled to each other at their opposing sides.

The second divided plate portion 12C includes a second magnet 12b. In other words, the second magnet 12b is arranged in the second divided plate portion 12C.

The third divided plate portion 12B includes a second magnetic body 12d. The second magnetic body 12d is a metal plate or the like which can be attracted to a magnet. The second magnetic body 12d is disposed within the third divided plate portion 12B. However, the second magnetic body 12d may also be exposed to an outside of the third divided plate portion 12B. In the illustrated example, the second magnetic body 12d is arranged along almost an entire longitudinal length of the third divided plate portion 12B.

The third plate portion 13 includes a third magnetic body 13c. The third magnetic body 13c is a metal plate or the like which can be attracted to a magnet. The third magnetic body 13c is disposed within the third plate portion 13. However, the third magnetic body 13c may also be exposed to an outside of the third plate portion 13. In the illustrated example, the third magnetic body 13c is arranged at a longitudinal end of the third plate portion 13 that is coupled to the second divided plate portion 12C (second plate portion 12).

In the cover mode of this embodiment, the third magnetic body 13c and the second magnet 12b overlap with each other in the thickness direction of the third plate portion 13 (see FIG. 9). As the third magnetic body 13c and the second magnet 12b are attracted to each other by magnetic force, a surface of the third plate portion 13 and surfaces of the first divided plate portion 12A, the second divided plate portion 12C and the third divided plate portion 12B are held to face each other, i.e., in a cover-mode posture.

Figure 10:
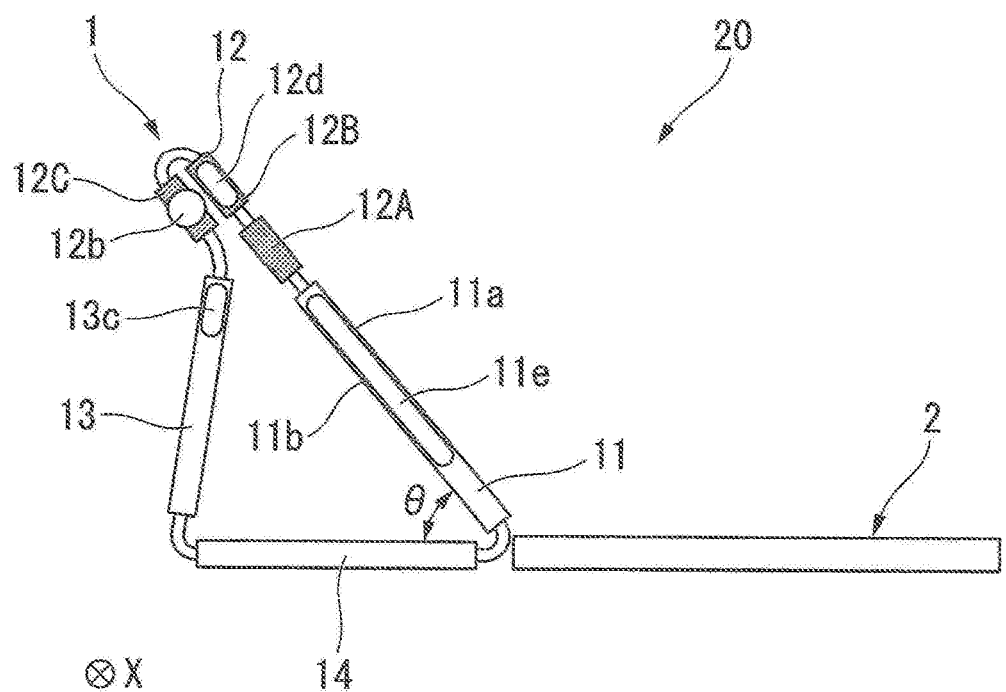
FIG. 10 is a side view schematically illustrating the stand device according to the second embodiment in the stand mode.
Figure 11:
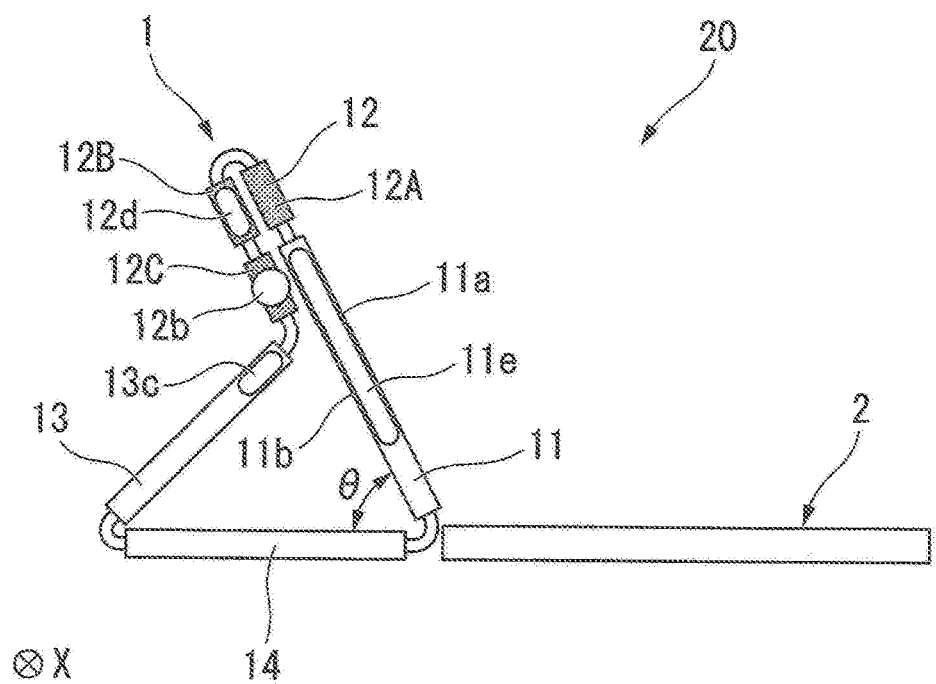
FIG. 11 is a side view schematically illustrating the stand device according to the second embodiment in the stand mode.
Figure 12:
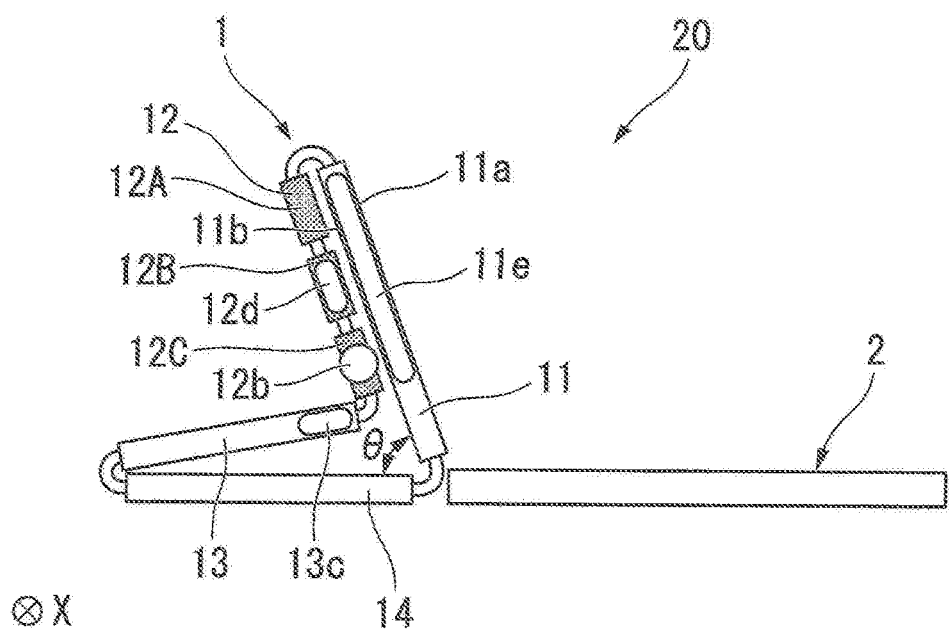
FIG. 12 is a side view schematically illustrating the stand device according to the second embodiment in the stand mode.

As illustrated in FIGS. 10 to 12, in the stand mode of this embodiment, an angle θ can be adjusted depending on which one(s) of the divided plate portions 12A, 12B and 12C is/are folded to a third plate portion 13 side. In other words, the angle θ is adjusted by inverting a part or all of the longitudinally divided second plate portion 12. Specifically, the angle θ in the stand mode is adjusted by inverting, from a cover-mode state, the second divided plate portion 12C, the third divided plate portion 12B and the first divided plate portion 12A in this order so that predetermined one(s) of them is/are arranged on the third plate portion 13 side, i.e., a back surface 11b side of the first plate portion 11 in a thickness direction thereof. Adjusting thus the angle θ controls an angle between the first plate portion 11 and the second cover 2.

In the example illustrated in FIG. 10, the second divided plate portion 12C among the plurality of divided plate portions 12A, 12B and 12C is arranged on the third plate portion 13 side, which results in setting the angle θ to 50°, for instance. In this stand mode (first stand mode), the second magnet 12b and the second magnetic body 12d overlap with each other in the thickness direction of the second divided plate portion 12C. As the second magnet 12b and the second magnetic body 12d are attracted to each other by magnetic force, a surface of the second divided plate portion 12C and a surface of the third divided plate portion 12B are held to face each other, i.e., in a first-stand-mode posture.

In the example illustrated in FIG. 11, the second divided plate portion 12C and the third divided plate portion 12B among the plurality of divided plate portions 12A, 12B and 12C are arranged on the third plate portion 13 side, which results in setting the angle θ to 60°, for instance. In this stand mode (second stand mode), the second magnet 12b and the first magnetic body 11e overlap with each other in the thickness direction of the second divided plate portion 12C. As the second magnet 12b and the first magnetic body 11e are attracted to each other by magnetic force, the surface of the second divided plate portion 12C and a back surface 11b of the first plate portion 11 are held to face each other, i.e., in a second-stand-mode posture.

In the example illustrated in FIG. 12, all of the plurality of divided plate portions 12A, 12B and 12C are arranged on the third plate portion 13 side, which results in setting the angle θ to 70°, for instance. In this stand mode (third stand mode), the second magnet 12b and the first magnetic body 11e overlap with each other in the thickness direction of the second divided plate portion 12C. As the second magnet 12b and the first magnetic body 11e are attracted to each other by magnetic force, the surface of the second divided plate portion 12C and the back surface lib of the first plate portion 11 are held to face each other, i.e., in a third-stand-mode posture.

The stand device 20 of this embodiment thus has a plurality of stand modes with respectively different angles θ.

According to the stand device 20 of this embodiment described above, a similar effect to that in the foregoing embodiment can be obtained.

Furthermore, in the stand mode of this embodiment, folding one or more of the divided plate portions 12A, 12B and 12C, as required, to the third plate portion 13 side (i.e., a side that is opposite to the electronic apparatus 50) allows a tilt angle of a display of an electronic apparatus 50 held by the first plate portion 11 to be adjusted so that the display is kept at an easy-to-see angle.

Third Embodiment

A stand device 30 according to a third embodiment of the present invention will now be described with reference to FIGS. 13 to 16. Note that like components as in the previous embodiments are denoted by like reference symbols, and their descriptions may be omitted.

Figure 13:
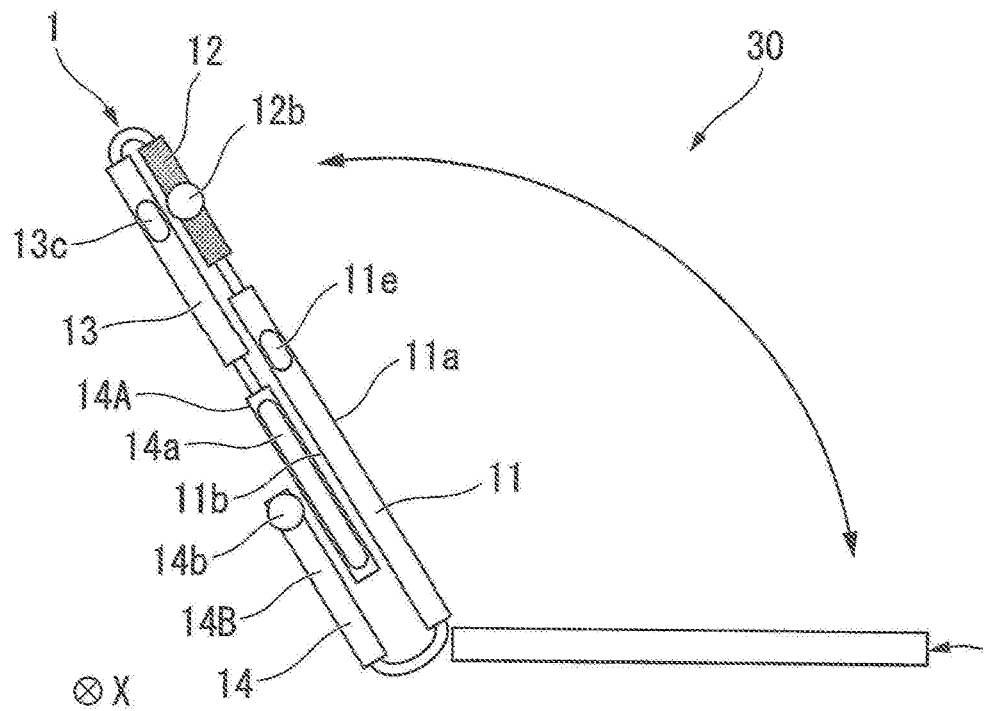
FIG. 13 is a side view schematically illustrating a stand device according to a third embodiment in the cover mode.

As illustrated in FIG. 13, in this embodiment, a first magnetic body 11e is arranged at a longitudinal end of a first plate portion 11 that is coupled to a second plate portion 12. A fourth plate portion 14 includes a plurality of sliding plate portions 14A and 14B that are slidable relative to each other in the longitudinal direction that is orthogonal to the thickness and lateral directions of the fourth plate portion 14. Each of the sliding plate portions 14A and 14B is a quadrilateral plate, specifically a rectangular plate. Each of the sliding plate portions 14A and 14B has a greater size in the lateral direction than in the longitudinal direction.

Among the plurality of sliding plate portions 14A and 14B, the first sliding plate portion 14A is coupled to a third plate portion 13 and the second sliding plate portion 14B is coupled to the first plate portion 11. A surface of the first sliding plate portion 14A and a surface of the second sliding plate portion 14B face each other. The first sliding plate portion 14A and the second sliding plate portion 14B at least partially overlap with each other in the thickness direction of the fourth plate portion 14.

The first sliding plate portion 14A includes a fourth magnetic body 14a. The fourth magnetic body 14a is a metal plate or the like which can be attracted to a magnet. The fourth magnetic body 14a is disposed within the first sliding plate portion 14A. However, the fourth magnetic body 14a may also be exposed to an outside of the first sliding plate portion 14A. In the illustrated example, the fourth magnetic body 14a is arranged along almost an entire longitudinal length of the first sliding plate portion 14A.

The second sliding plate portion 14B includes a fourth magnet 14b. The fourth magnet 14b is disposed within the second sliding plate portion 14B. However, the fourth magnet 14b may also be exposed to an outside of the second sliding plate portion 14B. In this embodiment, the fourth magnet 14b is arranged at a longitudinal end of the second sliding plate portion 14B that is opposite to the first plate portion (i.e., on the third plate portion 13 side).

In the cover mode, the fourth magnetic body 14a and the fourth magnet 14b overlap with each other in the thickness direction of the fourth plate portion 14 (see FIG. 13). As the fourth magnetic body 14a and the fourth magnet 14b are attracted to each other by magnetic force, a cover-mode posture is maintained.

Figure 14:
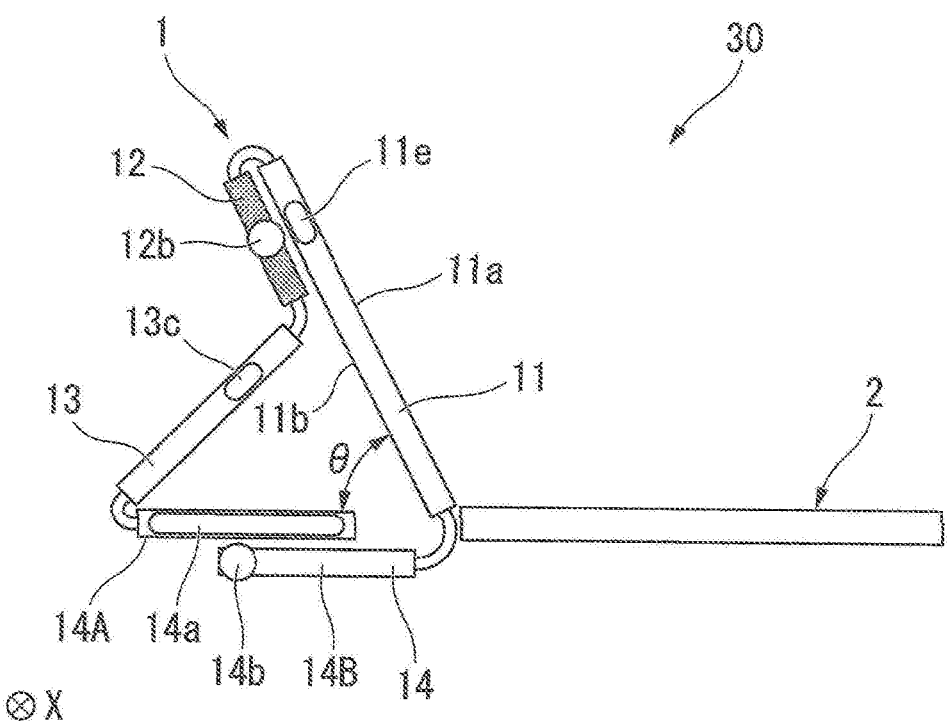
FIG. 14 is a side view schematically illustrating the stand device according to the third embodiment in the stand mode.
Figure 15:
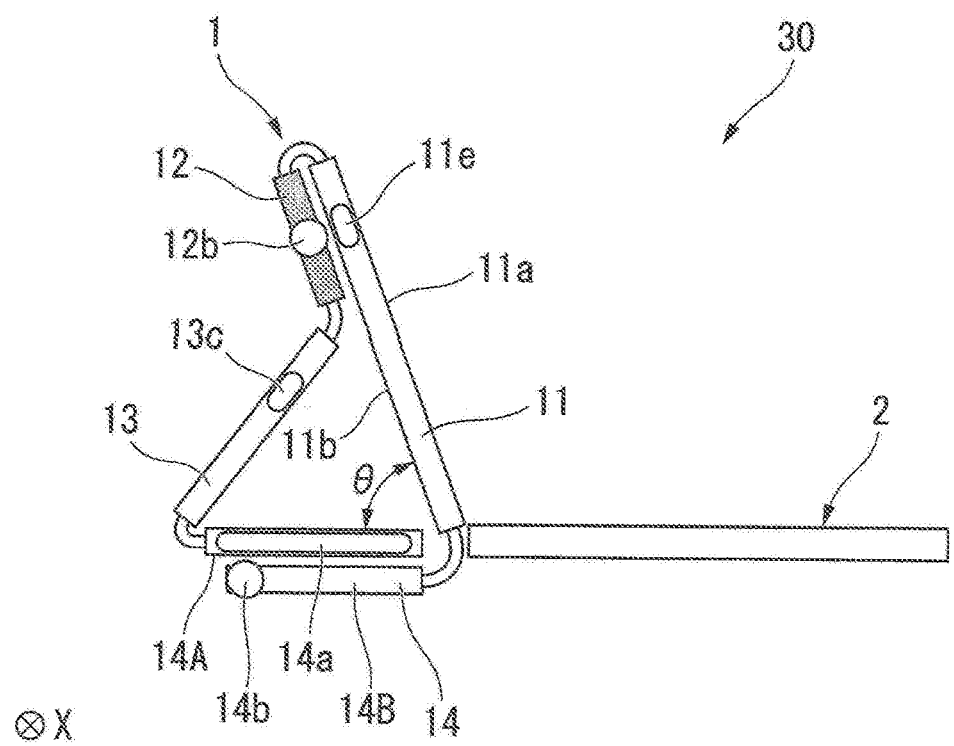
FIG. 15 is a side view schematically illustrating the stand device according to the third embodiment in the stand mode.
Figure 16:
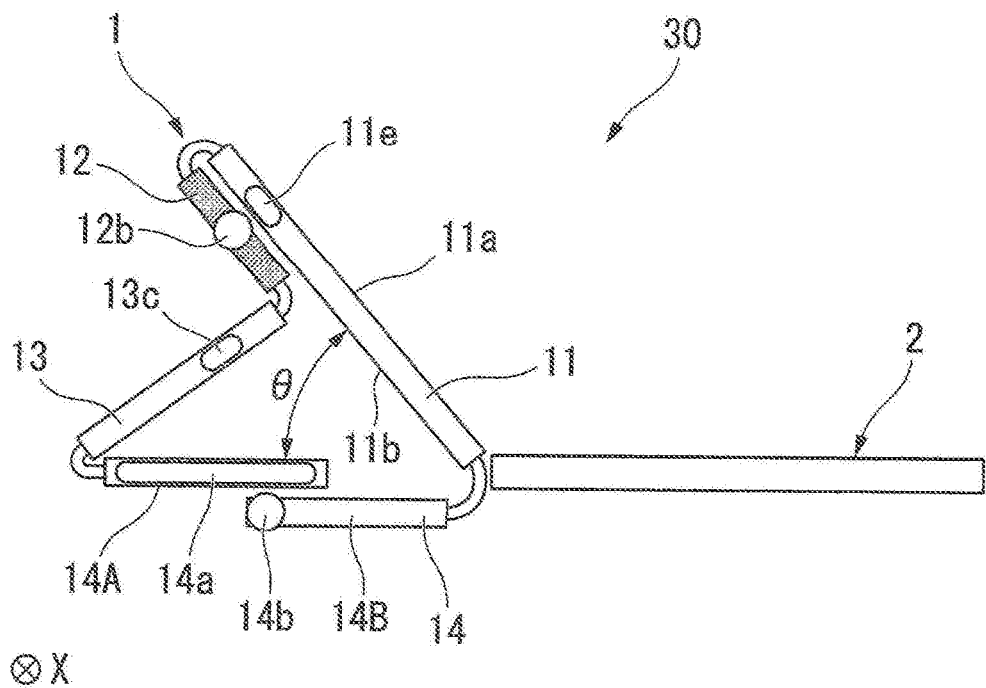
FIG. 16 is a side view schematically illustrating the stand device according to the third embodiment in the stand mode.

In the stand mode, as illustrated in FIGS. 14 to 16, the fourth plate portion 14 can be extended and retracted in the longitudinal direction by relatively sliding the plurality of sliding plate portions 14A and 14B in the longitudinal direction. In other words, a longitudinal length of the fourth plate portion 14 is adjusted by adjusting relative longitudinal positions of the first sliding plate portion 14A and the second sliding plate portion 14B. Extending and retracting thus the fourth plate portion 14 allows an angle θ to be adjusted, which controls an angle between the first plate portion 11 and the second cover 2.

To be more specific, in the stand mode illustrated in FIG. 14, a middle part of the fourth magnetic body 14a which is located between both longitudinal ends thereof and the fourth magnet 14b overlap with each other in the thickness direction of the fourth plate portion 14. In this stand mode, the angle θ is 60°, for example.

In the stand mode illustrated in FIG. 15, a longitudinal end of the fourth magnetic body 14a on the third plate portion 13 side (rear side) and the fourth magnet 14b overlap with each other in the thickness direction of the fourth plate portion 14. In this stand mode, the angle θ is 70°, for example.

In the stand mode illustrated in FIG. 16, a longitudinal end of the fourth magnetic body 14a on the first plate portion 11 side (front side) and the fourth magnet 14b overlap with each other in the thickness direction of the fourth plate portion 14. In this stand mode, the angle θ is 50°, for example.

According to the stand device 30 of this embodiment described above, a similar effect to those in the foregoing embodiments can be obtained.

Furthermore, in the stand mode of this embodiment, extending and retracting the fourth plate portion 14 allows a tilt angle of a display of an electronic apparatus 50 held by the first plate portion 11 to be adjusted so that the display is kept at an easy-to-see angle.

Fourth Embodiment

A stand device 40 according to a fourth embodiment of the present invention will now be described with reference to FIGS. 17 to 19. Note that like components as in the previous embodiments are denoted by like reference symbols, and their descriptions may be omitted.

Figure 17:
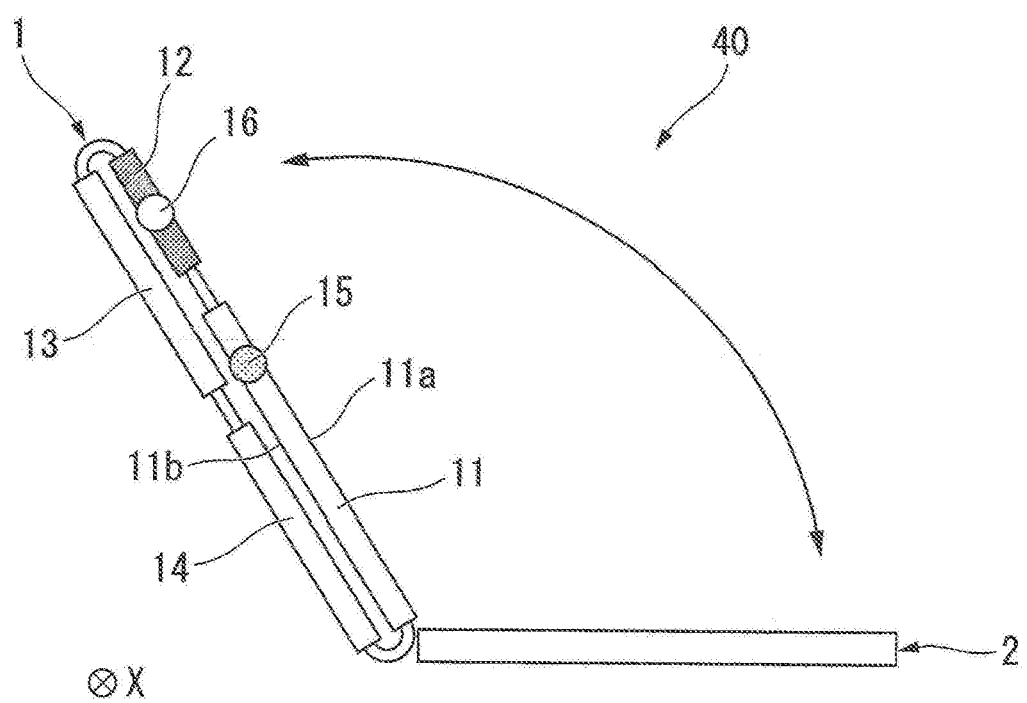
FIG. 17 is a side view schematically illustrating a stand device according to a fourth embodiment in the cover mode.

As illustrated in FIG. 17, in this embodiment, the first cover 1 is provided with a detection unit including a hall sensor 15 and a magnet 16 for the hall sensor. The detection unit can detect that the stand device is in the stand mode, and an input from an input unit 60 is defined as valid only when the stand mode is detected.

Figure 18A:
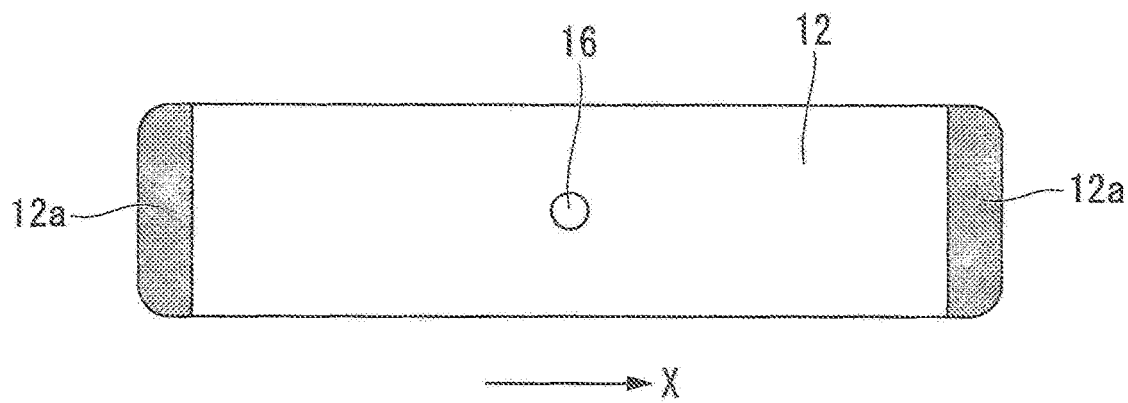
FIG. 18A is a plan view illustrating a second plate portion of the fourth embodiment.

In this embodiment, as illustrated in FIG. 18A, a second plate portion 12 includes the magnet 16 for the hall sensor. The magnet 16 for the hall sensor is arranged in a middle part of the second plate portion 12 which is located between both lateral ends thereof in the illustrated example.

Figure 18B:
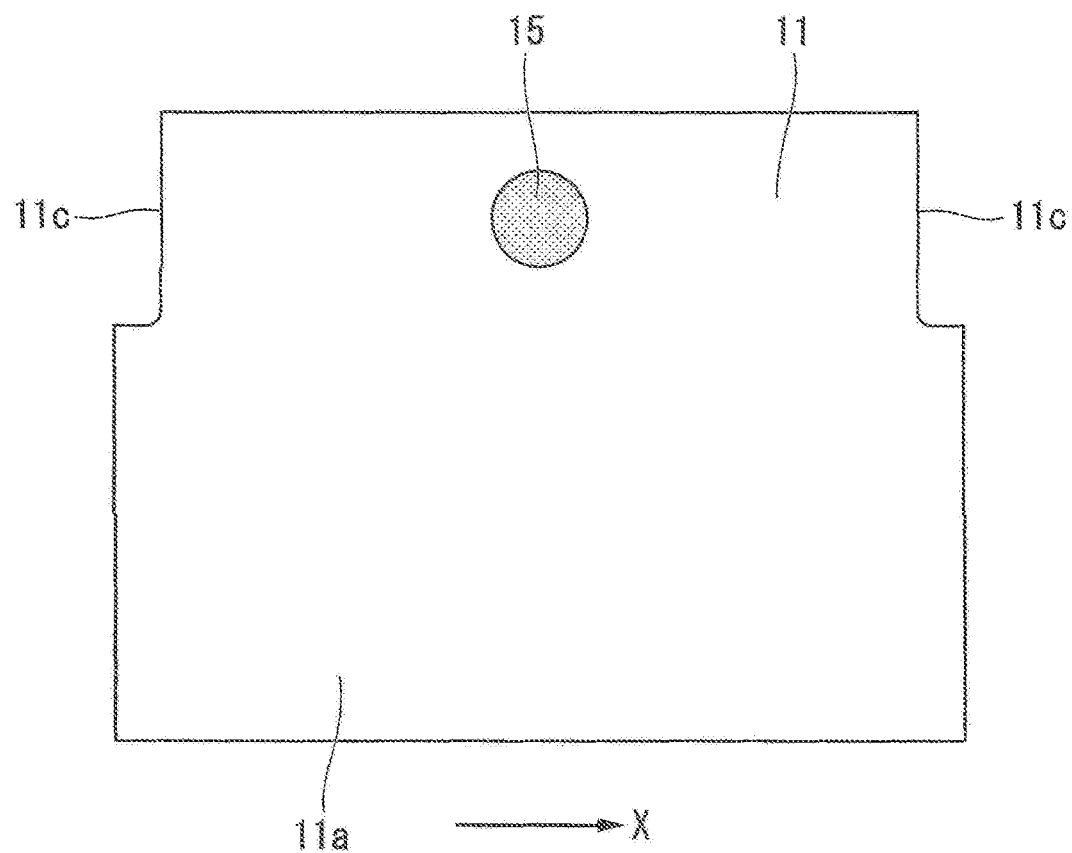
FIG. 18B is a plan view illustrating a first plate portion of the fourth embodiment.

As illustrated in FIG. 18B, a first plate portion 11 includes the hall sensor 15. The hall sensor 15 is arranged in a middle part of the first plate portion 11 which is located between both lateral ends thereof in the illustrated example. At the same time, the hall sensor 15 is arranged at a longitudinal end of the first plate portion 11 on the second plate portion 12 side.

In the cover mode, the hall sensor 15 and the magnet 16 for the hall sensor do not overlap with each other in the thickness direction of the first plate portion 11 (see FIG. 17).

Figure 19:
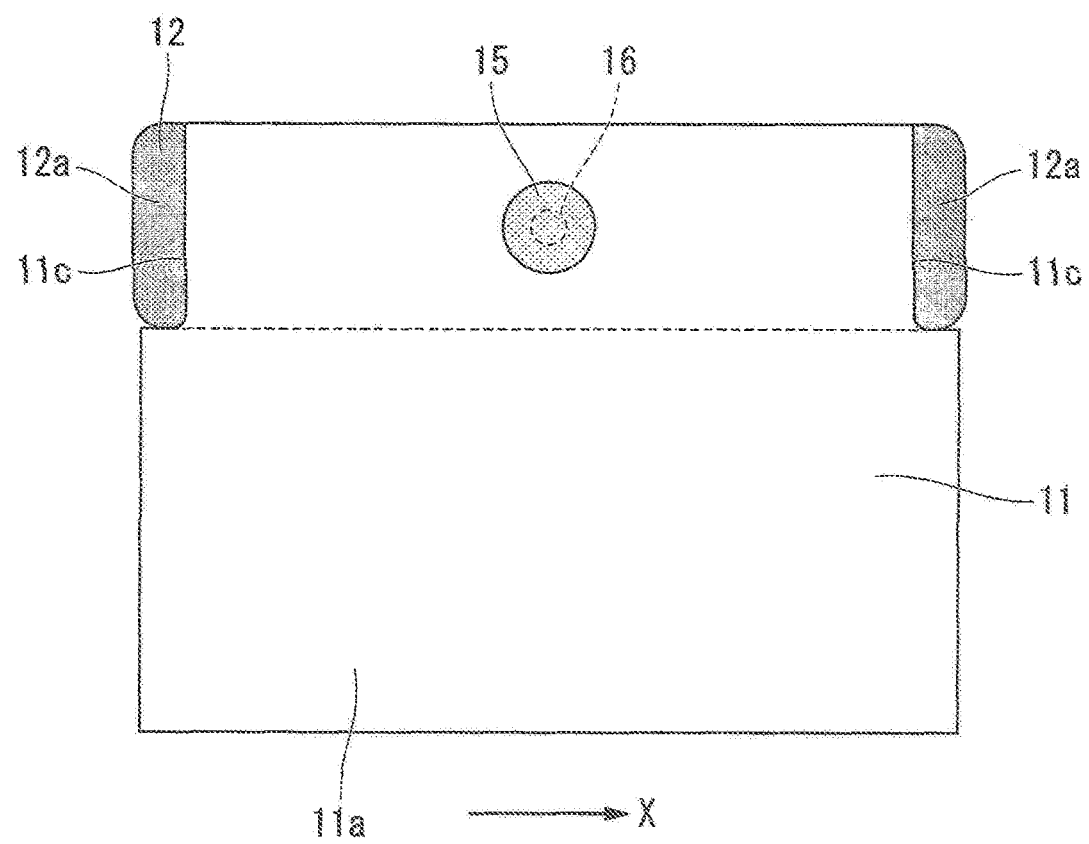
FIG. 19 is a plan view illustrating the first and second plate portions when the stand device according to the fourth embodiment is in the stand mode.

In the stand mode, as illustrated in FIG. 19, the hall sensor 15 and the magnet 16 for the hall sensor overlap with each other in the thickness direction of the first plate portion 11. The detection unit then detects that the stand device 40 has been switched to the stand mode.

According to the stand device 40 of this embodiment described above, a similar effect to those in the foregoing embodiments can be obtained.

Furthermore, in this embodiment, the input unit 60 can be enabled only when the detection unit detects that the stand device is in the stand mode. This can prevent an unintended erroneous input in the cover mode.

Note that the present invention is not limited to the embodiments described herein, and components thereof may be modified as explained below, for example, without departing from the gist of the present invention.

In the embodiments described herein, the electronic apparatus 50 is a foldable tablet PC that can be folded in half. However, the electronic apparatus 50 is not limited thereto. It can be a tablet PC that is non-foldable (i.e., cannot be folded in half) or the like.

In the embodiments described herein, the input unit 60 can output an input signal to the electronic apparatus 50 wirelessly. However, the input unit 60 is not limited to such one. It may include a group of terminals such as pogo pins that protrude from an outer surface of the input unit 60 in an extendable and retractable manner. Bringing this group of terminals into contact with a group of terminals provided on the electronic apparatus 50, the input unit 60 may be electrically wire-connected to the electronic apparatus 50. This can prevent interferences between users in a case where a plurality of users gather in an area such as in educational scenes.

In the embodiments described herein, the input unit 60 is a keyboard. However, the input unit 60 is not limited thereto. It may be a precision touch pad (PTP) or others, for example.

In the foregoing first embodiment, the third plate portion 13 and the second plate portion 12 are attracted to each other by magnetic force in the cover mode illustrated in FIG. 4. However, the cover mode is not limited to such a configuration. Instead, the first plate portion 11 and either one of the third plate portion 13 and the fourth plate portion 14 may be attracted to each other by magnetic force.

Other components explained in the embodiments described herein and modifications thereof may be combined without departing from the gist of the present invention, and additions, omissions, replacements, and other modifications of components are also possible. The present invention shall not be limited by the embodiments described herein but is limited only by claims appended hereto.

The invention claimed is:

1. A stand device comprising:
   a first cover configured to hold an electronic apparatus in an upright posture; and
   a second cover configured to support an input unit that can output an input signal to the electronic apparatus, wherein
   the first cover and the second cover are pivotably connected to each other at opposing side portions thereof,
   the first cover includes a first plate portion configured to support a rear surface of the electronic apparatus, a second plate portion coupled to the first plate portion, a third plate portion coupled to the second plate portion and a fourth plate portion coupled to the third plate portion and the first plate portion, the first to fourth plate portions being connected with each other at four hinged points, via flexible members, to form an endless annular shape, and
   the stand device is switchable between a stand mode in which the third plate portion, the fourth plate portion and at least a part of the first plate portion are arranged to form a triangle while the first to fourth plate portions remain connected to each other at the four hinged points via the flexible members; and a cover mode in which the first plate portion, the second plate portion, the third plate portion and the fourth plate portion are folded into a two-layer plate while the first to fourth plate portions remain connected to each other at the hinged four points via the flexible members.

2. The stand device according to claim 1, wherein the second plate portion comprises a grip portion that is arranged at an end of the second plate portion and at a side of the second plate portion that is coupled to the first plate portion.

3. The stand device according to claim 2, wherein the first plate portion comprises a first cutout portion that is configured to overlap with the grip portion in the stand mode.

4. The stand device according to claim 2, wherein the third plate portion comprises a second cutout portion that is configured to overlap with the grip portion in the cover mode.

5. The stand device according to claim 2, wherein the grip portion is exposed to both sides of the second plate portion in the stand mode and the cover mode, respectively.

6. The stand device according to claim 2, wherein the grip portion extends in a longitudinal direction that is orthogonal to the thickness and lateral directions of the second plate portion.

7. The stand device according to claim 1, wherein, in the stand mode, the first plate portion and the second plate portion are attracted to each other by magnetic force.

8. The stand device according to claim 1, wherein, in the cover mode, the second plate portion and the third plate portion are attracted to each other by magnetic force, or the first plate portion and either of the third plate portion and the fourth plate portion are attracted to each other by magnetic force.

9. The stand device according to claim 1, wherein the second plate portion comprises a plurality of divided plate portions that are mutually divided in a longitudinal direction that is orthogonal to a lateral direction in which a side of the second plate portion that is coupled to the first plate portion extends and orthogonal to a thickness direction of the second plate portion.

10. The stand device according to claim 1, wherein, the fourth plate portion is extendable and retractable, thereby, in the stand mode, the fourth plate portion allows an angle between the first plate portion and the second cover to be adjusted.

11. The stand device according to claim 1, wherein
the first cover comprises a detection unit which detects that the stand device is in the stand mode, and
an input from the input unit is defined as valid only when the stand mode is detected.

* * * * *